OBSERVED DEPARTURE FROM COSINE RESPONSE

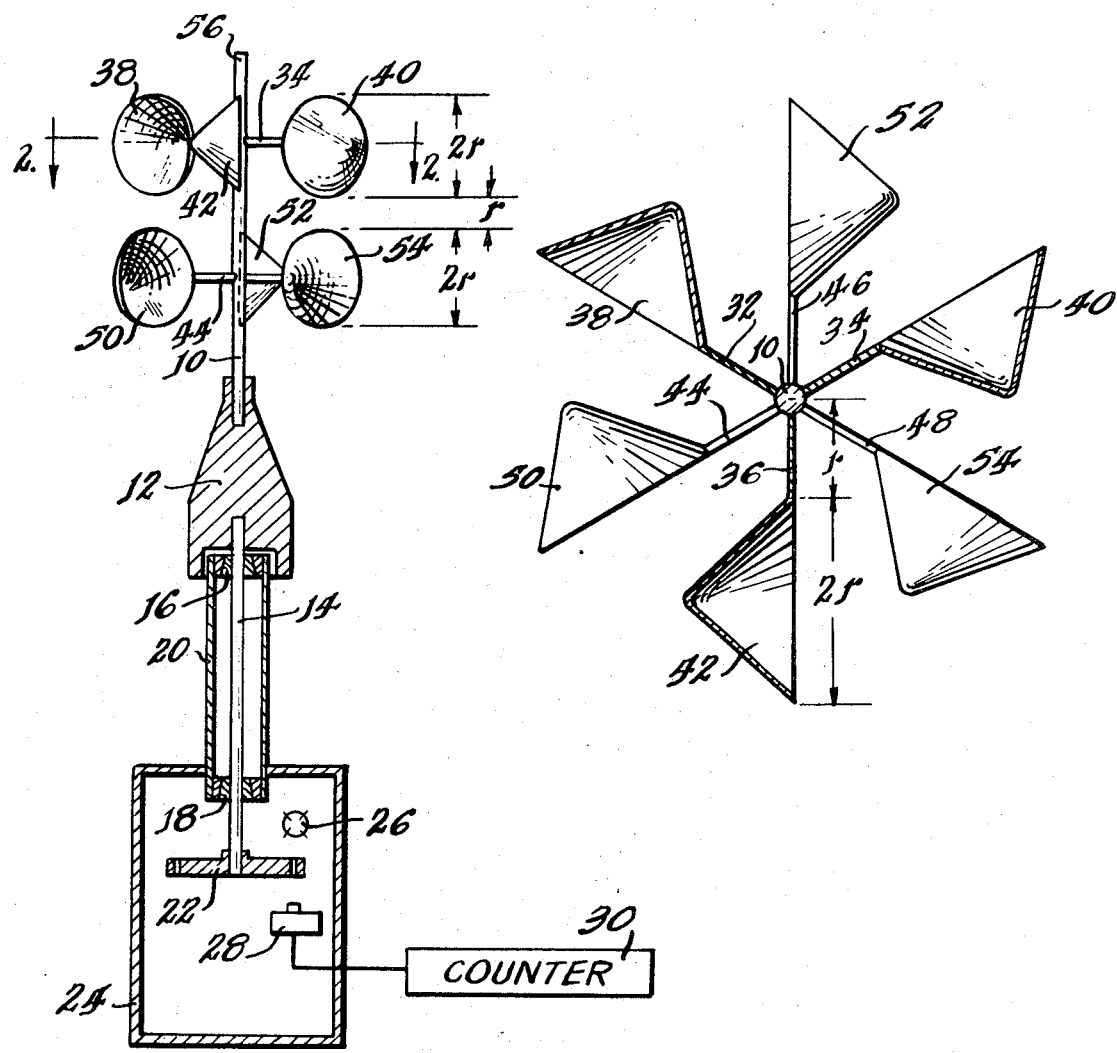

Inventors
Paul Frenzen
Richard L. Hart
Attorney

United States Patent Office 3,541,855
Patented Nov. 24, 1970

3,541,855
ANEMOMETER FOR MEASURING HORIZONTAL
WIND VELOCITIES
Paul Frenzen, Palos Heights, and Richard L. Hart,
Berwyn, Ill., assignors to the United States of America
as represented by the United States Atomic Energy
Commission
Filed Dec. 5, 1968, Ser. No. 781,438
Int. Cl. G01p 5/06
U.S. Cl. 73—229                                9 Claims

ABSTRACT OF THE DISCLOSURE

An anemometer includes a rotatable shaft and means for measuring the velocity of rotation of the shaft. A first set of three anemometer cups are equispaced about the shaft in a plane normal thereto to rotate therewith. A second set of three anemometer cups are equispaced about the shaft between the first set of anemometer cups in a plane normal to the shaft to rotate therewith. The planes of the two sets of anemometer cups are separated along the shaft a distance which is proportional to the diameter of the cups and the radial distance of the cups from the shaft.

CONTRACTUAL ORIGIN OF THE INVENTION

The invention described herein was made in the course of, or under a contract with the United States Atomic Energy Commission.

BACKGROUND OF THE INVENTION

This invention relates to cup anemometers and more particularly to cup anemometers for measuring horizontal wind velocities.

A conventional three-cup anemometer rotating at a steady velocity of rotation $\omega$ in a steady horizontal wind stream having a speed $\overline{V}$ will realize an average velocity of rotation which is controlled in part by the fact that during rotation each cup interferes for a short time with the air flow directed upon the cup immediately ahead of it. This shading effect by the anemometer cups is compensated for by calibrating the anemometer in a wind tunnel. However, in practice, real winds frequently depart from the horizontal. Departure of the wind from the horizontal by an angle $\theta$ will affect all conventional cup anemometers, causing them to speed up in their angular rotation by an error factor $\Delta\omega = f(\theta)$. This error factor results from the wind flow passing over the top or under the bottom of the interfering cup to partially relieve the blocking effect thereof. Due to this effect, overspeeding errors of 5% can result in the conventional cup anemometer with winds having an angle $\theta = 20°$ from the horizontal. It is to be further appreciated that, with winds at an angle $\theta$ to the horizontal, the true horizontal speed of the winds is equal to $\overline{V}\cos\theta$ which, when the wind has an angle of 20° to the horizontal, is 6% less than the value $\overline{V}$. Thus, for a wind inclined 20° to the horizontal, the true error horizontal speed of the wind as measured by a conventional cup anemometer can approach 10%.

Accordingly, it is one object of the present invention to provide a cup anemometer which can accurately measure horizontal wind speeds.

It is another object of the present invention to provide a cup anemometer which can measure horizontal speeds of wind within ½ of 1% when the wind flows at an angle of up to 20° from the horizontal.

Other objects of the present invention will become more apparent as the detailed description proceeds.

In general, the anemometer of the present invention comprises a rotatable shaft and means for measuring the velocity of rotation of the shaft. A first plurality of like anemometer cups are equispaced about the shaft radially therefrom in a plane normal thereto to rotate therewith. A second plurality of like anemometer cups are equispaced about said shaft radially therefrom between said first anemometer cups in a plane normal to the shaft to rotate therewith. The planes of the first and second anemometer cups are separated along the shaft a distance proportional to the diameter of the cups and the radial distance of the cups from the shaft.

BRIEF DESCRIPTION OF THE DRAWINGS

Further understanding of the present invention may best be obtained from consideration of the accompanying drawings wherein:

FIG. 1 is a sectional side view of an apparatus constructed according to the present invention.

FIG. 2 is an enlarged sectional view along line 2—2 of the apparatus of FIG. 1.

In FIG. 1, a shaft 10 has one end thereof in press-fit engagement with an upper-bearing cover 12. The cover 12 is fixedly mounted to one end of a second shaft 14 which is rotatably mounted via bearings 16 and 18 through a housing 20. The other end of the shaft 14 extending from housing 20 has a slotted wheel 22 attached thereto to rotate therewith. A lower-casing cover 24 is mounted about the housing 20 and slotted wheel 22, as shown. Light source 26 is mounted on one side of slotted wheel 22 and a photocell 28 is mounted on the other side of slotted wheel 22 and aligned to detect light transmission from the light source 26 through the slots of wheel 22. A counter 30 records the output from the photocell 28.

Figure 3:
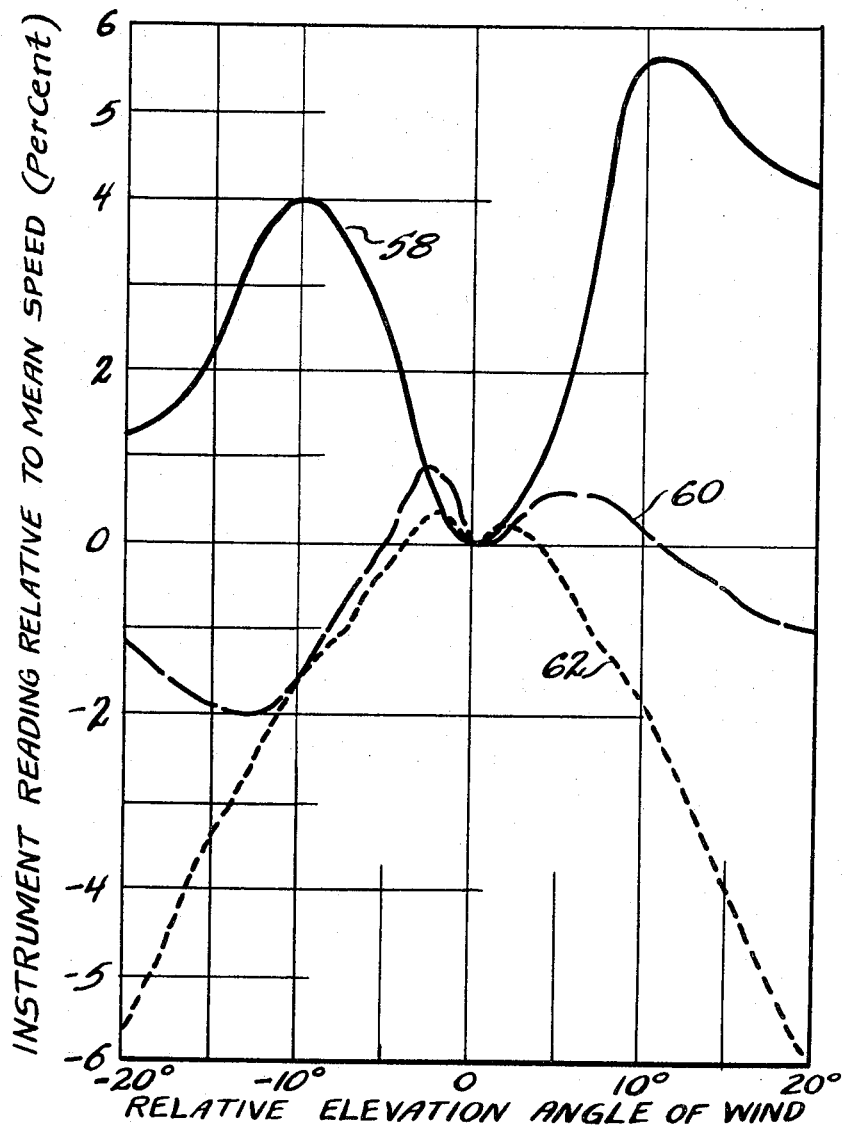
FIG. 3 is a graphical plot of measurements obtained with the apparatus of FIGS. 1 and 2.

Equispaced about shaft 10 in a plane normal thereto and radially extending therefrom are mounted a first group of arms 32, 34 and 36. To each arm is attached an associated anemometer cup 38, 40 and 42. The anemometer cups 38, 40 and 42 are mounted to effect the same wind-driven rotational motion. A second group of arms 44, 46 and 48 is mounted in a plane normal to the shaft 10 extending radially therefrom. The arms 44, 46 and 48 are equispaced about the shaft 10 midway between the arms 32, 34 and 36. This spatial relationship will be better appreciated by referring to the plan view of the apparatus shown in FIG. 2. Anemometer cups 50, 52 and 54 are each attached to an associated one of the arms 44, 46 and 48 to effect the same wind-driven rotational motion as cups 38, 40 and 42.

For the practice of the present invention, it has been found that the spacing along the shaft 10 between the planes in which arms 32, 34 and 36 and arms 44, 46 and 48 lie is directly related to the spacing between the anemometer cups attached thereto and the lengths of the arms. Thus, where the lengths of the arms 32, 34 and 36 and 44, 46 and 48 are each equal to approximately one anemometer cup radius, then the spacing of the planes between the arms is approximately three anemometer cup radii. It will be noted that, according to the present invention, if the arms 32, 34, 36, 44, 46 and 48 are increased in length, then the spacing between the aforedescribed planes will increase. With this size relationship, improved accuracy in the measurement of horizontal wind speeds will be obtained over anemometers heretofore available.

Further improvement in the accuracy of the anemometer constructed according to the present invention has been found if the end 56 of shaft 10 extends beyond the plane of arms 32, 34 and 36 a distance sufficient to provide aerodynamic equivalency of the anemometer cup arrangement relative to both ascending and descending winds. Thus, the shaft 10 should extend beyond the plane defined by arms 32, 34 and 36 a distance greater than the radius of an anemometer cup.

With the structure as shown in FIGS. 1 and 2, wind striking the anemometer cups 38, 40 and 42 and 50, 52 and 54 causes rotation of the shaft 10 which, in turn, rotates slotted wheel 22. The light from source 26 is detected by photocell 28 as the slots in wheel 22 appear therebetween. By counting the pulse output of photocell 28 on counter 30 for a particular time interval, a measure of the rotational velocity of the shaft 10 may be obtained to provide a measure of horizontal wind speed.

Turning to FIG. 3, plots are shown of results obtained with an apparatus constructed according to FIGS. 1 and 2. For the results of FIG. 3, the anemometer cups 38, 40, 42, 50, 52 and 54 were one-inch in diameter cups and were mounted on arms which extended radially ½ inch from the shaft 10. The plane defined by arms 44, 46 and 48 was 1$^{25}$⁄$_{32}$ inches from the top of the upper-bearing cover 12. The plots shown in FIG. 3 indicate the percentage departure in the reading of the anemometer relative to the mean speed $\overline{V}$ of the wind as the angle of the wind is varied through angle $\theta$ from the horizontal. As previously stated, the true horizontal speed of the wind departing by an angle $\theta$ from the horizontal is $\overline{V} \cos \theta$. Accordingly, the output of the anemometer should approach a cosine curve to provide a true measure of the horizontal speed of the wind as the wind departs from the horizontal by an angle $\theta$ at a speed $\overline{V}$.

Figure 4:
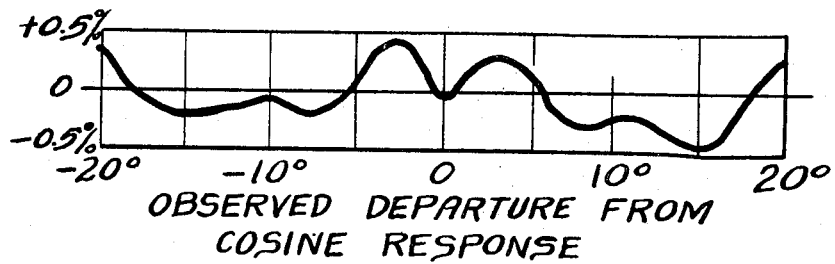
FIG. 4 is a graphical plot of the data of curve 62 in FIG. 3 to illustrate departures from the cosine-response ideal.

Curve 58 was obtained with the planes defined by arms 32, 34, 36 and arms 44, 46 and 48 separated approximately one cup diameter (one inch). It is readily obvious from curve 58 that serious overspeeding occurs in the anemometer for winds departing from the horizontal by even small angles. Curve 60 represents the output of the counter 30 with the planes defined by the arms of the anemometer separated along the shaft 10 a distance approximately three radii (1$^{11}$⁄$_{32}$ inches). It will be noted that this spatial relationship between the planes markedly improves the accuracy of the anemometer in measuring the horizontal speeds of winds, especially for ascending winds. Curves 58 and 60 were both obtained with the end 56 of shaft 10 terminating at the arms 32, 34 and 36. Curve 62 was obtained with the shaft 10 having the end 56 thereof extending beyond the arms 32, 34 and 36 a distance of ⅝ inch and with the anemometer arm spacing as described for curve 60. It is readily apparent that this structure effects the desired improved accuracy in measuring the horizontal speeds of both ascending and descending winds. Curve 62 approximates the ideal cosine behavior to provide an accurate measurement of the horizontal speed of winds even when such winds depart from the horizontal by an angle $\theta$ equal to 20°. In FIG. 4, the data of curve 62 in FIG. 3 are replotted as observed departures from the cosine-response ideal, wherefrom it will be appreciated that the horizontal speed of the wind is measured within ±0.5 percent of the actual value for winds deviating from the horizontal by angles from −20° to +20°.

Similar results were obtained with two-inch anemometer cups mounted on one-inch radial arms with 2¾ inches spacing between the arms along the shaft and the shaft extending one inch above the upper arms.

Persons skilled in the art will, of course, readily adapt the general teachings of the invention to embodiments far different from the embodiments illustrated. Accordingly, the scope of the protection afforded the invention should not be limited to the particular embodiment illustrated in the drawings and described above but should be determined only in accordance with the appended claims.

The embodiments of the invention in which an exclusive property or privilege is claimed are defined as follows:

1. An anemometer comprising a rotatable shaft, means for measuring the velocity of rotation of said shaft, a first plurality of like anemometer cups equispaced about said shaft radially therefrom in a plane normal thereto to rotate therewith, and a second plurality of like anemometer cups equispaced about said shaft radially therefrom between said first anemometer cups in a plane normal to said shaft to rotate therewith, said planes of said anemometer cups being separated along said shaft a distance proportional to the diameter of said cups and the radial distance of said cups from said shaft to effect a cosine response for said anemometer.

2. The apparatus according to claim 1 wherein said anemometer cups are radially displaced from said shaft a distance approximately equal to the radius of said anemometer cups and said first plurality of anemometer cups is displaced from said second plurality of anemometer cups a distance along said shaft approximately equal to the radius of said cups.

3. The apparatus according to claim 1 wherein each of said planes of said anemometer cups is disposed along said shaft from an associated end thereof a distance to provide like aerodynamic characteristics for said first and second pluralities of anemometer cups about said shaft relative to both ascending and descending winds.

4. The apparatus according to claim 1 wherein said rotatable shaft extends beyond each of said planes of said first and second pluralities an anemometer cups a distance greater than the radius of said cups.

5. An anemometer cup assembly comprising a shaft, a first plurality of like arm members mounted to said shaft radially extending therefrom in a plane normal to said shaft, a first plurality of like anemometer cups each mounted to an associated first arm member, a second plurality of like arm members mounted to said shaft extending therefrom in a plane normal to said shaft and displaced along said shaft a distance from said first arm members proportional to the length of said arm members and the diameter of said anemometer cups, and a second plurality of like anemometer cups each mounted to an associated second arm member.

6. The anemometer cup assembly according to claim 5 wherein said first plurality of like arm members comprise three arm members mounted to and equispaced about said shaft radially extending therefrom in a plane normal to said shaft, said first plurality of like anemometer cups comprise three anemometer cups each mounted to an associated one of said first arm members to provide like rotational motion, said second plurality of like arm members comprise three arm members mounted between said first arm members and equispaced about said shaft radially extending therefrom a plane normal to said shaft and displaced along said shaft a distance from said first arm members proportional to the length of said arm members and the diameter of said anemometer cups, said second plurality of like anemometer cups comprise three anemometer cups each mounted to an associated one of said second arm members to provide like rotational motion.

7. The anemometer cup assembly according to claim 6 wherein said first and second arm members are each approximately one anemometer-cup radius long, and said second arm members are displaced along said shaft a distance from said first arm members approximately equal to three anemometer-cup radii.

8. The anemometer cup assembly according to claim 7 wherein said first arm members are mounted to said shaft a distance from an associated end thereof to provide like aerodynamic characteristics for said first and second anemometer cups about said shaft relative to both ascending and descending winds.

9. The anemometer cup assembly according to claim 7 wherein said first arm members are mounted to said shaft a distance from an associated end thereof greater than one anemometer-cup radius.

References Cited

UNITED STATES PATENTS 1,593,291   7/1926   Critchlow _____ 73—229

FOREIGN PATENTS 475,969   11/1937   Great Britain.

JERRY W. MYRACLE, Primary Examiner

U.S. Cl. X.R.

73—189